(12) United States Patent
Nimberger

(10) Patent No.: US 6,851,450 B2
(45) Date of Patent: Feb. 8, 2005

(54) LIQUID FERTILIZER DISTRIBUTION SYSTEM AND METHOD

(75) Inventor: Spencer M. Nimberger, Houston, TX (US)

(73) Assignee: PGI International, Ltd., Houston, TX (US)

(*) Notice: Subject to any disclaimer, the term of this patent is extended or adjusted under 35 U.S.C. 154(b) by 0 days.

(21) Appl. No.: 10/387,686

(22) Filed: Mar. 13, 2003

(65) Prior Publication Data

US 2004/0025947 A1 Feb. 12, 2004

Related U.S. Application Data

(62) Division of application No. 09/778,518, filed on Feb. 6, 2001, now Pat. No. 6,557,573.

(51) Int. Cl.⁷ .................................................. B05B 1/14
(52) U.S. Cl. .................................... 137/561 A; 239/553
(58) Field of Search ............................. 137/561 A, 594, 137/627.5, 627; 239/553, 553.5, 590, 590.3

(56) References Cited

U.S. PATENT DOCUMENTS

| | | | | | |
|---|---|---|---|---|---|
| 4,284,243 A | * | 8/1981 | Shaner | .................... | 239/553.5 |
| 4,807,663 A | * | 2/1989 | Jones | .................... | 239/593 |
| 5,040,558 A | * | 8/1991 | Hickey et al. | .................... | 137/1 |
| 5,271,567 A | * | 12/1993 | Bauer | .................... | 137/561 A |
| 5,287,877 A | * | 2/1994 | Ackroyd | .................... | 137/561 A |
| 5,372,160 A | * | 12/1994 | Ward | .................... | 137/561 A |
| 6,311,716 B1 | * | 11/2001 | Jones | .................... | 137/118.02 |

* cited by examiner

Primary Examiner—Kevin Lee
(74) Attorney, Agent, or Firm—Browning Bushman

(57) ABSTRACT

Apparatus and methods are provided for a fluid fertilizer distributor 10, 200, 300, or 400 for distributing fluid fertilizer conducted from a supply vessel 11 to each of a plurality of applicator lines 44. The fluid distributor may regulate a fluid fertilizer flow rate by selectively moving a flow restrictor 50, 250, 350, or 450 relative to the distributor housing. The distributor housing may include a supply inlet port 12, 212, 312, or 412 and a plurality of distributor out ports 16, 216, 316, or 416 each for fluid communication with a respective one of the plurality of applicator lines 44. The fluid distributor may separate the fluid fertilizer into a plurality of fluid flow paths prior to reducing the pressure in the fluid to avoid gas flashing or vaporization prior to separation. Thereby, fluid distribution may be effected upon a substantially liquid fluid within the fluid distributor, which may result in substantially uniform fertilizer application, with reduced rate variation between applicator lines. The flow restrictor 50, 250, 350, or 450 may be substantially ring shaped and positioned on an external surface of the distributor housing, or substantially cylindrical shaped and positioned substantially internal to the distributor housing. The fluid distributor may provide for substantially infinitely regulating the application rate between a fully closed position and a fully open position. Rate regulation may be performed manually or by programmable controller.

15 Claims, 13 Drawing Sheets

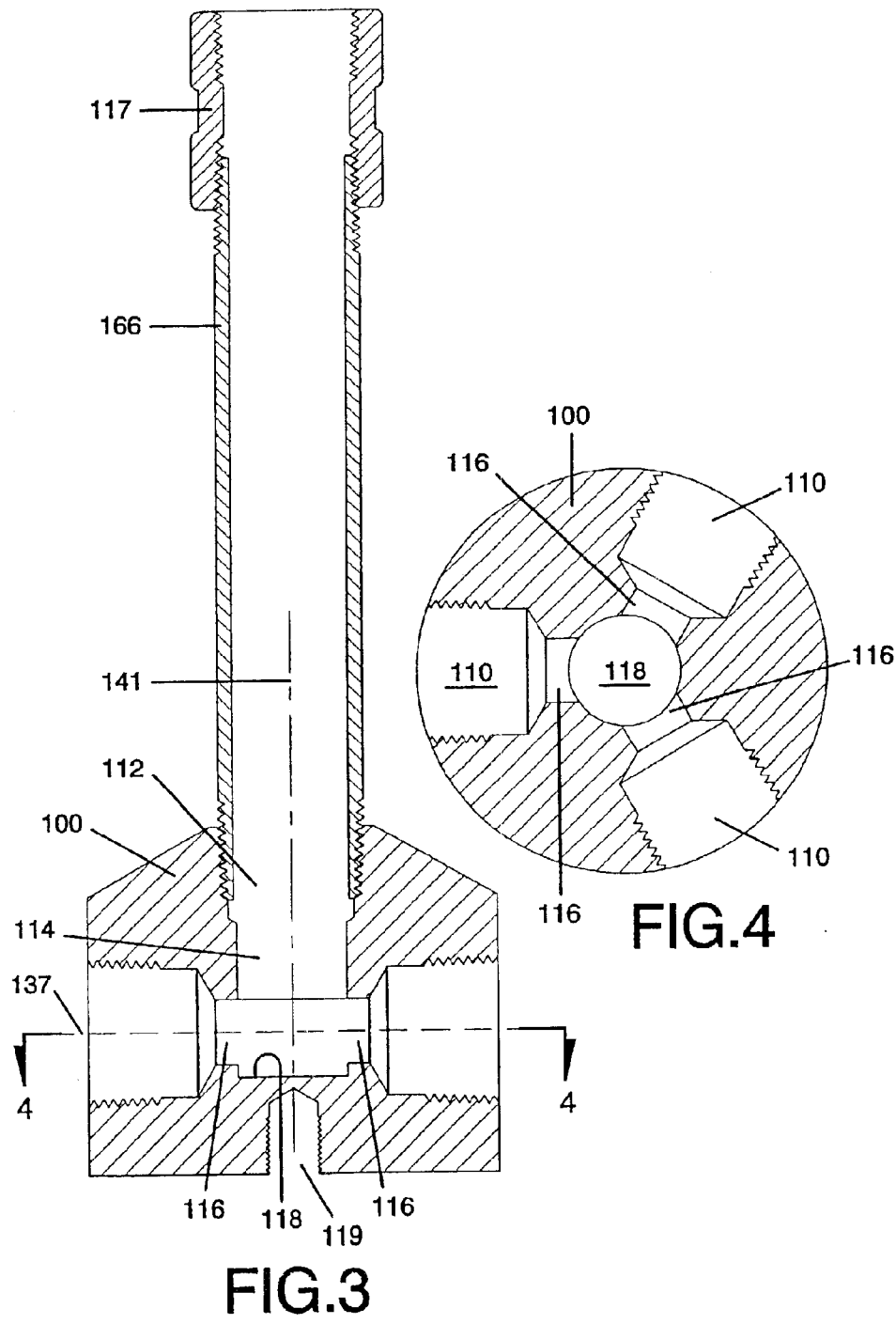

LIQUID FERTILIZER DISTRIBUTION SYSTEM AND METHOD

This is a divisional of application Ser. No. 09/778,518, filed Feb. 6, 2001, now U.S. Pat. No. 6,557,573.

FIELD OF THE INVENTION

The present invention relates to applying fluids to crop fields in the agricultural industry using a multiple distribution point applicator. More particularly, this invention relates to uniformly distributing and selectively outputting multiple fluid streams of a single or multiplephase fluid from a fluid distributor manifold. More particularly, this invention relates to an improved method and system for distributing liquid fertilizer at a substantially equal rate to each of a plurality of distribution lines. The method and system of this invention facilitate more even distribution of fertilizer to each of the plurality of knives on an applicator.

BACKGROUND OF THE INVENTION

Agricultural crop producers routinely apply liquid fertilizer to crop fields to replenish depleted nutrients beneficial to crop production. A common fertilizer used to replenish nitrogen in the soil is anhydrous ammonia ("$NH_3$"). An applicator may include a plurality of selectively spaced "knives" or "shanks," which may be pulled through the soil at a selected depth, typically farming tractor. A fertilizer application line may be positioned immediately behind each knife and extend nearly to the knife tip to release a selected amount of fertilizer into the soil as the knife is pulled through the soil. A disc may follow behind each knife and turn the soil to seal in the $NH_3$ so it can mix with soil moisture to provide nitrogen to growing crops.

Fertilizer type and application rates may vary depending upon crop type. $NH_3$ application rates may range from less than 40 pounds per acre to in excess of 200 ponds per acre. Applicators may include as few as 8 knives to in excess of 40 knives, and may be arranged across an applicator tool bar spanning a width of over 50 feet.

In a common arrangement, the bulk $NH_3$ may be provided in a pressurized tank or "nursebottle" pulled behind the applicator. One or more high pressure hoses may function as a supply line to conduct $NH_3$ from the nurse-bottle to one or more distributors.

The distributor may manifold the $NH_3$ from a single supply line to each of a plurality of applicator lines, with each applicator line positioned substantially adjacent and behind a knife. $NH_3$ may be conducted to the distributor through an inlet port positioned substantially within the center of an array of outlet ports. Unused ports may be plugged. The supply line, the applicator lines and the distributor may include a number of fittings, valves, obstructions, and changes of flow-direction, each of which may create a tortuous flow path and resultant pressure drops along the flow path.

Accurate and even application of anhydrous ammonia over the length of the applicator tool bar has been a significant problem which the farming industry has struggled to solve for many years. The fluid-phase state of $NH_3$ is sensitive to each of pressure and temperature. $NH_3$ may exist in a gas or vapor phase, a liquid phase, or both, depending upon the pressure and temperature conditions. Pressure drops may result in generation and/or expansions of a vapor phase. The vapor phase may consume a relatively high percentage of the available conduit volume and maybe much more mobile or conductive, and thus more difficult to meter or control than the liquid phase. Devices commonly used to measure and divide the liquid to each knife may work well in a homogenous fluid streams, but may not perform well when random vapor pockets traveling within the liquid stream are encountered. Pockets of vapor may severely retard or impede liquid flow and/or measurement uniform distribution of anhydrous ammonia.

To provide greater distribution and application control and rate consistency between the knives, it is commonly more desirable to distribute liquid $NH_3$ with no vapor to each of the application lines. The presence of a vapor phase within the distribution system may result in significant rate variability between knives. For example, some knives may be receiving two to four times more $NH_3$ than other knives. Thereby, some crops may risk being burned, while others may be starved for nitrogen, the results of which may show up in crop yield, color and/or quality.

A number of products have been developed to improve liquid fertilizer distribution. One general group of distributors operates by generating a cyclone to create a vortex within the distributor and utilizes a vertical dam to segregate the liquid phase from the vapor phase. One such device is marketed by Continental $NH_3$ Products, and is commonly referred to as a vertical dam manifold, as described in U.S. Pat. No. 5,372,160. The device may utilize interchangeable distribution rings that differ in the number of outlet holes and in the size of the outlet holes. In theory, one side of the dam is flooded with liquid while the other side of the dam contains the vapor phase. The liquid phase portion of the fertilizer is distributed to each of the plurality of applicator line outlets in an attempt to provide substantially equal rates of liquid to each applicator line. The vapor is allowed to rejoin the liquid streams downstream of the liquid distribution. A fluid backpressure is preferably maintained upstream of the distribution ring, thereby maintaining a reduced vapor phase. A distributor providing small outlet ports may be required for low application rates, while a different distributor having larger outlet port sizes may be required for higher application rates. Although improved results may be obtained with such product as compared to more conventional distributors, results may reflect average application rate differences between knives in excess of 15% from the mean rate. Other devices using the cyclonic or spray principle are disclosed in U.S. Pat. No. 4,807,663, issued to Jones, and U.S. Pat. No. 4,284,243, issued to Shaner.

A second general group of prior art distributors uses rotors to mix or homogenize the twophases into a mixture. U.S. Pat. No. 6,003,532 discloses a device that attempts to homogenize the two-phase vapor-liquid stream prior to distribution. The device uses a rotating flywheel driven by the incoming fluid to spin at a high velocity and sweep the incoming fluid rapidly past evenly spaced output holes on the inner surface of a distribution ring. The rapid sweeping action ideally homogenizes the mixture and thereby uniformly distributes the fertilizer. A desirable back-pressure is maintained by utilizing a distribution ring having appropriately sized outlet holes. Another device using the rotor technique is disclosed in U.S. Pat. No. 5,333,640, issued to Swift. Multiple distribution rings are thus generally required for a diversity of application ranges. Another drawback to this design is wear and maintenance of additional moving parts.

A third type of distributor utilizes a pump to increase fluid pressure in the distributor prior to distribution. Pressure may be increased to a level such that the pressure at each exit nozzle behind a respective knife may be greater than tank pressure. For example, injection pressure may be 150 psig, while tank pressure may be less than 120 psig. Thereby, the $NH_3$ may remain in a liquid phase as it is conducted from the tank, through the system to the exit nozzle. Some additional pressure may be required to account for $NH_3$ temperature increases within the system. The distributor may include a first arrangement of small-diameter distributor orifices that provide an appropriate regulation of rate at low application rates and speeds. A piston may be provided to move in response to increased pump pressure and/or applicator speed, exposing a second arrangement of distributor orifices having slightly larger diameters. Thereby, for a particular injection pressure the application rate may be increased. Such distributor system may be relatively expensive and maintenance intensive, requiring relatively complicated machining and expensive tooling on the piston, manifold and orifices. In addition, the pump is required, including means for powering, positioning, controlling, and maintaining the pump.

An improved method and system is desired for distributing liquid fertilizers substantially equally across the applicator bar. An improved method is desired which is economical and may be effective across a broad range of application rates and pressures without need for purchasing additional distributor equipment or pumps. The disadvantages of prior art are overcome by the present invention.

SUMMARY OF THE INVENTION

This invention has particular utility in applying fluid fertilizer, such as anhydrous ammonia ("$NH_3$"), in an agricultural application. More particularly, this invention may improve distribution of a substantially equal amount of fertilizer to each of a plurality of applicator lines. The methods and apparatus of this invention provide a fertilizer distributor apparatus and system that improves fertilizer distribution rates and reduces rate variation between applicators. The improvement may be realized at least partially by distributing the fertilizer to each of the plurality of distributor lines substantially as a liquid phase, before creating or permitting fluid pressure-drops in the system. As discussed above, pressure drops may result in generation of a gas or vapor phase, which may result in variable distribution rates between applicator lines carrying a high percentage of gas phase and lines carrying a high percentage of liquid phase.

A fluid distributor is provided for receiving fluid fertilizer in an inlet and through a flow chamber, with substantially negligible pressure drops. Fluid in the flow chamber may be distributed to each of a plurality of distributor outlet ports, each connected to an applicator line, such that any substantial pressure drop may occur substantially during or downstream of the distribution. The applicator lines may dispose of the fluid fertilizer from within the lines into a respective row of earth, which may be mechanically broken and tilled to mix the fertilizer with the soil. An adjustably positionable flow restrictor to permit a desired flow rate through the fluid distributor, and permits a corresponding fluid pressure drop in the distributed fluid. Selective movement of the flow restrictor may facilitate a substantially equal and corresponding adjustment in each of the plurality of applicator lines. Adjustment may vary substantially infinitely, from noflow to full-open, substantially unrestricted flow in the applicator lines.

An object of the invention is to adjust the flow rate to each of a plurality of applicator lines such that a desired total fertilizer application rate may be maintained through the plurality applicator lines and at a substantially equal or uniform application rate in each of the plurality of applicator lines. Thereby, fertilizer application may be performed uniformly across the applicator bar at substantially any desired flow-rate, back-pressure and/or supply tank pressure.

The above objective may be facilitated by an adjustable orifice in the flow path to each applicator line, with the orifice located downstream or at the point of fluid distribution. Fertilizer distribution may be performed on a substantially liquid phase, while substantial pressure-drops may occur individually in the applicator lines after fluid distribution. The orifices may be collectively and uniformly adjusted to attain the maximum back pressure while still applying a desired fertilizer rate to the crops.

It is a further object of this invention to prevent occurrence of a significant vapor/gas phase upstream of fluid distribution. The maximum cumulative cross-sectional area of the flow areas at or downstream of the point of fluid distribution may be equal to or less than the maximum crosssectional flow area of distributor inlet.

It is also an object of this invention to provide a distributor that may distribute a fluid fertilizer without substantial generation of vapors or gases, and which significantly reduces the fluid pressure only after distribution.

Yet another object of this invention is to provide a flow divider wherein the maximum crosssectional flow area in the flow chamber between the inlet port and the outlet ports is no greater than a cross-sectional flow area at the supply inlet.

It is a feature of this invention to provide a fluid distributor including an inlet port, a plurality of outlet ports, a flow chamber between the inlet port and the plurality of outlet ports, and a flow restrictor adjusting the rate of fluid fertilizer through the fluid distributor.

It is an additional feature of this invention to provide a fluid distributor wherein a maximum cross-sectional flow area in the flow chamber is no greater than a cross-sectional flow area at the supply inlet port.

Another feature of this invention is that the flow restrictor may be positioned between the distributor outlet ports and a plurality of applicator lines, thereby facilitating creating the pressure drop and/or adjusting the fluid flow rate in a portion of each of the distributor outlet ports downstream of the distribution point.

It is an additional feature of this invention to provide for motorized and/or programmable controller to control the fluid fertilizer application rate and the fluid pressure in the system upstream of the point of fluid distribution. A flow meter, a flow restrictor and/or a flow controller, such as a motor or actuator, may be monitored and/or controlled by a programmable controller, or manually.

An additional feature is that the flow restrictor may be substantially cylindrical-shaped and positioned at least partially within an interior portion of the distributor housing to reduce the fluid pressure substantially immediately after fluid distribution.

It is a further feature of this invention that the substantially cylindrical-shaped flow restrictor may be moveable axially along a flow restrictor axis, relative to the distributor housing.

Another feature of this invention is that a substantially sleeve-shaped housing orifice ring including a plurality of orifices therein to conduct fluid may be positioned within the distributor housing to provide a surface to seal with the flow restrictor.

Still another feature of this invention is that a substantially sleeve-shaped housing orifice ring may include a plurality of slot-shaped orifices therein to conduct fluid within the distributor housing to increase the number of applicator lines which may be connected to a distributor housing.

It is a further feature of this invention that a flow restrictor seal member may be secured to the flow restrictor to shut off fluid flow through the fluid distributor when the flow restrictor is in a closed position.

It is yet another feature of this invention to provide a setting indicator secured to one or more components of the fluid distributor for indicating the position of the flow restrictor relative to the distributor housing.

It is an advantage of this invention that one or more of the flow restrictor, the flow restrictor seal member, the housing orifice ring, and/or the distributor housing may be formed from a polymer material to increase sealing effectiveness between components.

It is another advantage of this invention that existing fluid fertilizer equipment may be fitted with a fluid distributor according to this invention.

It is an advantage that a fluid distributor according to this invention may be relatively simple and economical to manufacture, install, use, repair and adjust to a particular fluid fertilizer application rate.

Another advantage of this invention is that a fluid distributor according to this invention may be useful over a wide spectrum of application rates and pressures.

It is yet another advantage of this invention that fluid fertilizer application rates may be substantially uniform across the multiple applicator distribution lines, with reduced fluid rate variability between applicators. Thereby, improvements may be realized in fertilizer efficiency, crop performance and yields, while reducing fertilizer waste, fertilizer over-concentration damage to crops, and potential environmental hazards due to nitrate formations within groundwater.

These and further objects, features, and advantages of the present invention will become apparent from the following detailed description, wherein reference is made to figures in the 10 accompanying drawings.

BRIEF DESCRIPTION OF THE DRAWINGS

FIG. 3 is a cross-sectional side view of a suitable flow divider according to the present invention.

FIG. 4 is a cross-sectional top view taken along lines 4—4 in FIG. 3.

DETAILED DESCRIPTION OF PREFERRED EMBODIMENTS

Figure 2:
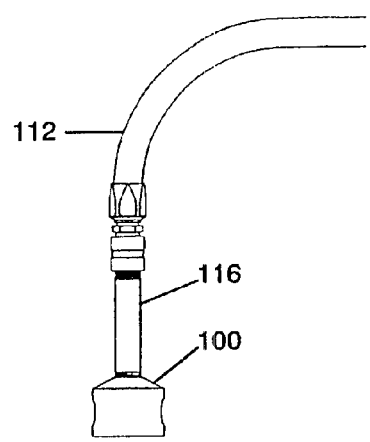
FIG. 2 is a side view of a supply inlet hose and the flow divider illustrated in FIG. 1.
Figure 1:
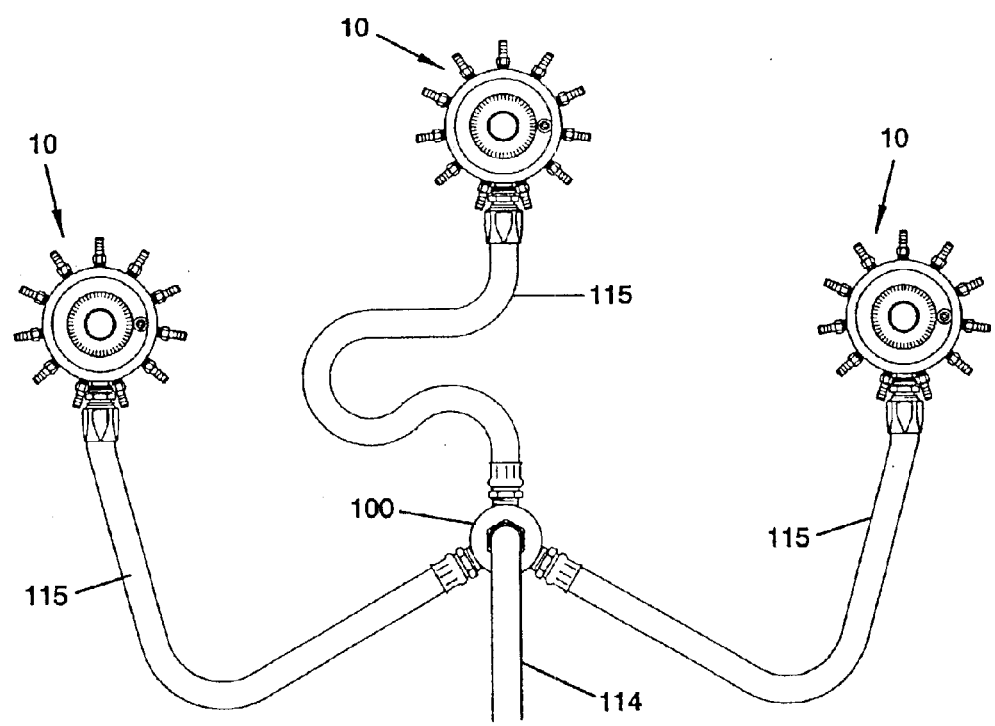
FIG. 1 is a top-view, conceptual diagram of a suitable fluid fertilizer system employing a fluid divider and three fluid distributors.
Figure 19:
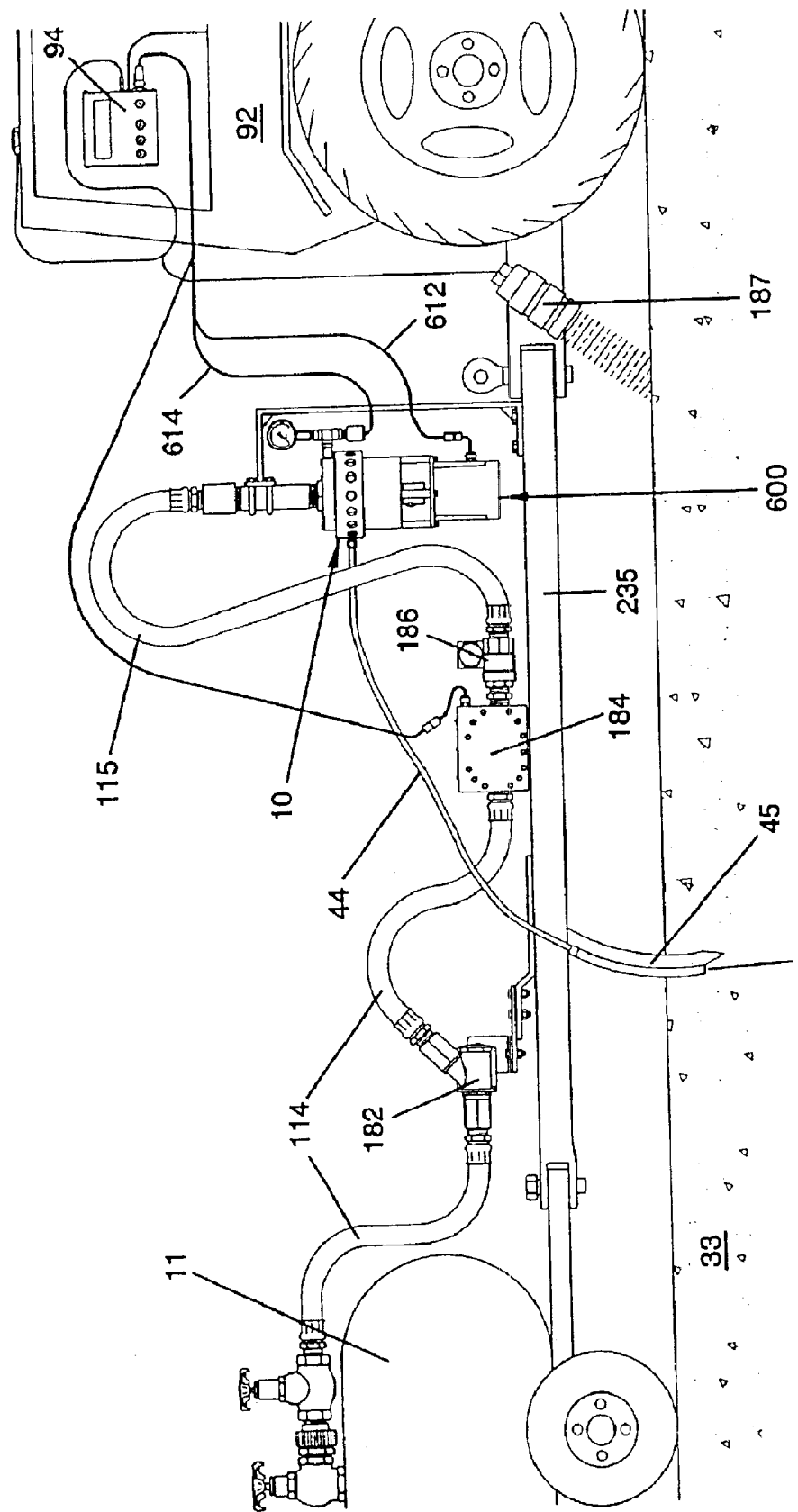
FIG. 19 is a side view illustration of a fluid fertilizer system such as may be used to apply the fluid fertilizer, utilizing a motor-controlled fluid distributor.

FIGS. 1 and 19 illustrates components that may be included in a fluid fertilizer distribution system according to the present invention, including a flow divider and three fluid distributors. A suitable system may include a tractor 92 pulling a knife implement 235 for breaking the soil, followed by a fluid fertilizer supply vessel 11. A primary supply hose 114 may conduct fertilizer from the supply vessel 11 to a flow divider 100, as shown in FIG. 1, or directly to a fluid distributor 10, as shown in FIG. 19.

A flow divider 100, as illustrated in FIGS. 3 and 4, may be used to distribute fluid fertilizer from a primary supply hose 114 to at least two secondary supply hoses 14, each of which may conduct fluid fertilizer to a respective fluid distributor 10. Each fluid distributor 10 may distribute fertilizer to each of a plurality of applicator lines 44 and reduce the fluid pressure in the fertilizer during or after distribution. Each applicator line 44 may conduct the fertilizer to a discharge point 185 substantially near the tip of the knife 45, which may be breaking the soil 33 ahead of the applicator line discharge point 185. A pull-apart safety joint 182 having a low pressure drop may be included in the flow conduit 114, and a shut-off valve 186 may be positioned in the fully open position, each to avoid generation of a substantial fluid pressure drop therein. A flow meter 184 may be provided to meter the fertilizer rate, and may be electrically connected to a controller 94 to provide rate information to the controller 94. A ground speed sensor 187 may provide a vehicle rate signal to the controller, such that the vehicle rate signal and the flow rate signal may be used by the controller 94 to determine a fertilizer application rate.

The fluid fertilizer flow divider 100 distributes fluid fertilizer conducted from the supply vessel 11 to at least two fluid fertilizer distributors 10, and may comprise a divider inlet port 112 and at least two divider outlet ports 116. Connector 117 may connect a supply line 114 to a nipple 166 having an axial length of at least six times the nominal diameter of the nipple 166 to align fluid flow substantially along an inlet port axis 141. The nipple 166 may threadably engage the flow divider 100 at an inlet port 112. A divider flow chamber 114 may conduct the fluid from the inlet port 112 to a fluid impingement surface 118 and to each of at least two outlet ports 116. The embodiment illustrated in FIG. 4 illustrates three outlet ports 116.

The divider inlet port 112 defines the inlet port axis 141. Each of the at least two divider outlet ports 116 may be positioned within a divider outlet port plane 137 substantially perpendicular to the divider inlet port axis 141. The divider flow chamber 114 may include a divider impingement surface 118 substantially perpendicular to and directly in line with the divider inlet axis 141 for impingement of the fluid fertilizer from the divider inlet port 112.

A maximum cross-sectional flow area in the flow chamber 114 between the divider supply inlet port 112 and the at least two divider outlet ports 116 is no greater than a cross-sectional flow area at the divider supply inlet port. A maximum combined cross-sectional flow area of the at least two divider outlet ports at a plane of intersection of each of the at least two divider outlet ports 116 and the flow chamber 114 is no greater than a cross-sectional flow area at the supply inlet port 112. Thereby, the fluid may not experience a pressure drop due to expansion which might otherwise permit a portion of the fluid to flash or vaporize to a gas in the flow divider 100 prior to dividing the inlet flow stream into at least two outlet flow streams.

Figures 5, 6:
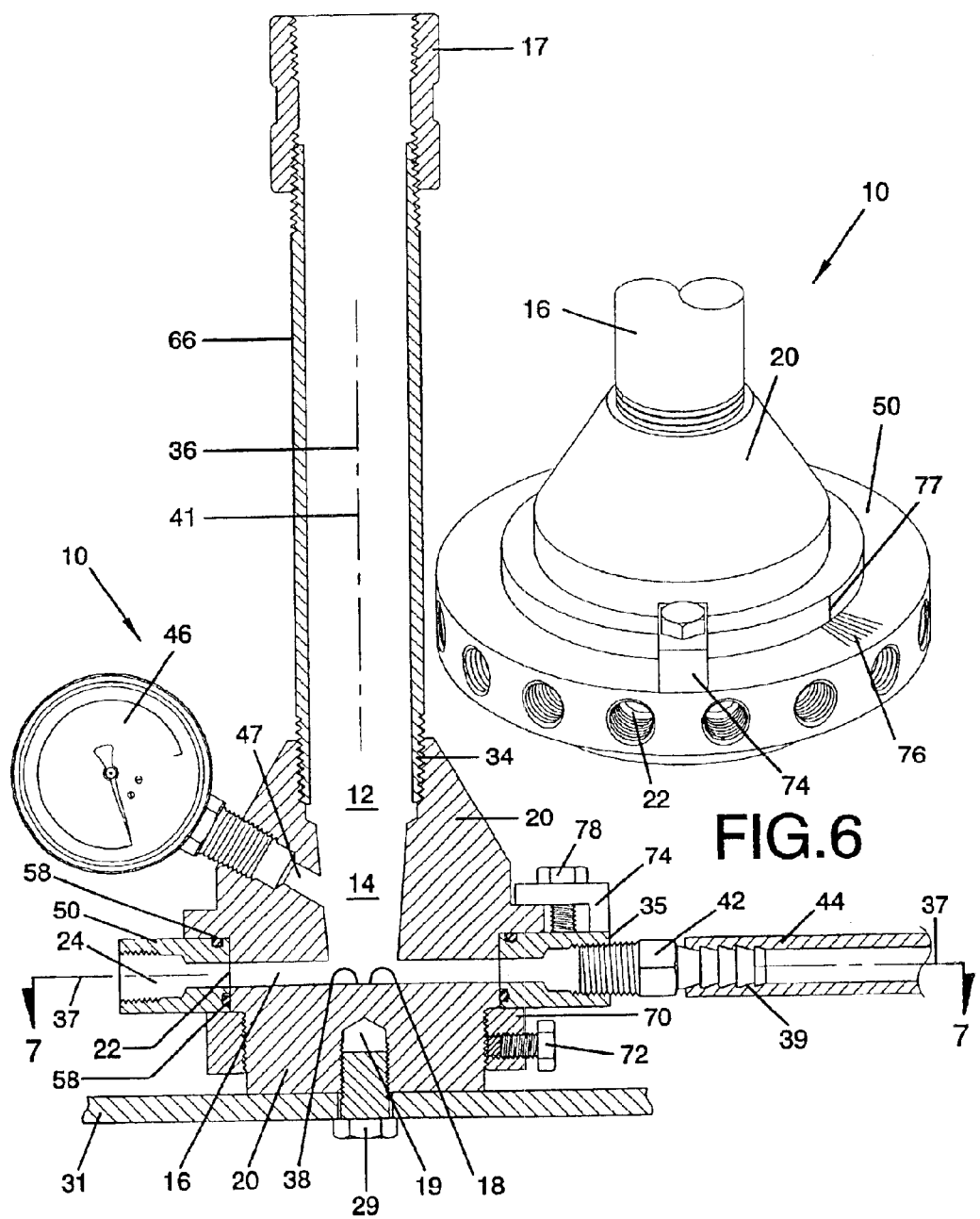
FIG. 5 is a cross-sectional view of a rotatable ring-style fluid distributor according to the present invention.
FIG. 6 is an orthogonal view of the ring-style fluid distributor illustrated in FIG. 5.

Referring to FIGS. 5 and 6, and secondarily to FIGS. 1, and 19, a fluid fertilizer distributor 10 according to the present invention for distributing fluid fertilizer conducted from a nurse tank/supply vessel 11 to each of a plurality of applicator lines may comprises a distributor housing 20, a flow chamber 14, and a flow restrictor 50. Fluid may be conducted from the supply vessel 11 through a relatively large diameter hose 14 to keep fluid turbulence and line pressure losses to a minimum. The hose 14 and related conductors may be "sweeping," in that flow path turns, curvatures and directional changes may utilize a long radius of curvature to further avoid fluid pressure losses and fluid turbulence. Reducing the turbulence and pressure losses in the conduits may reduce generation of a gas/vapor phase within the fluid.

Figure 12:
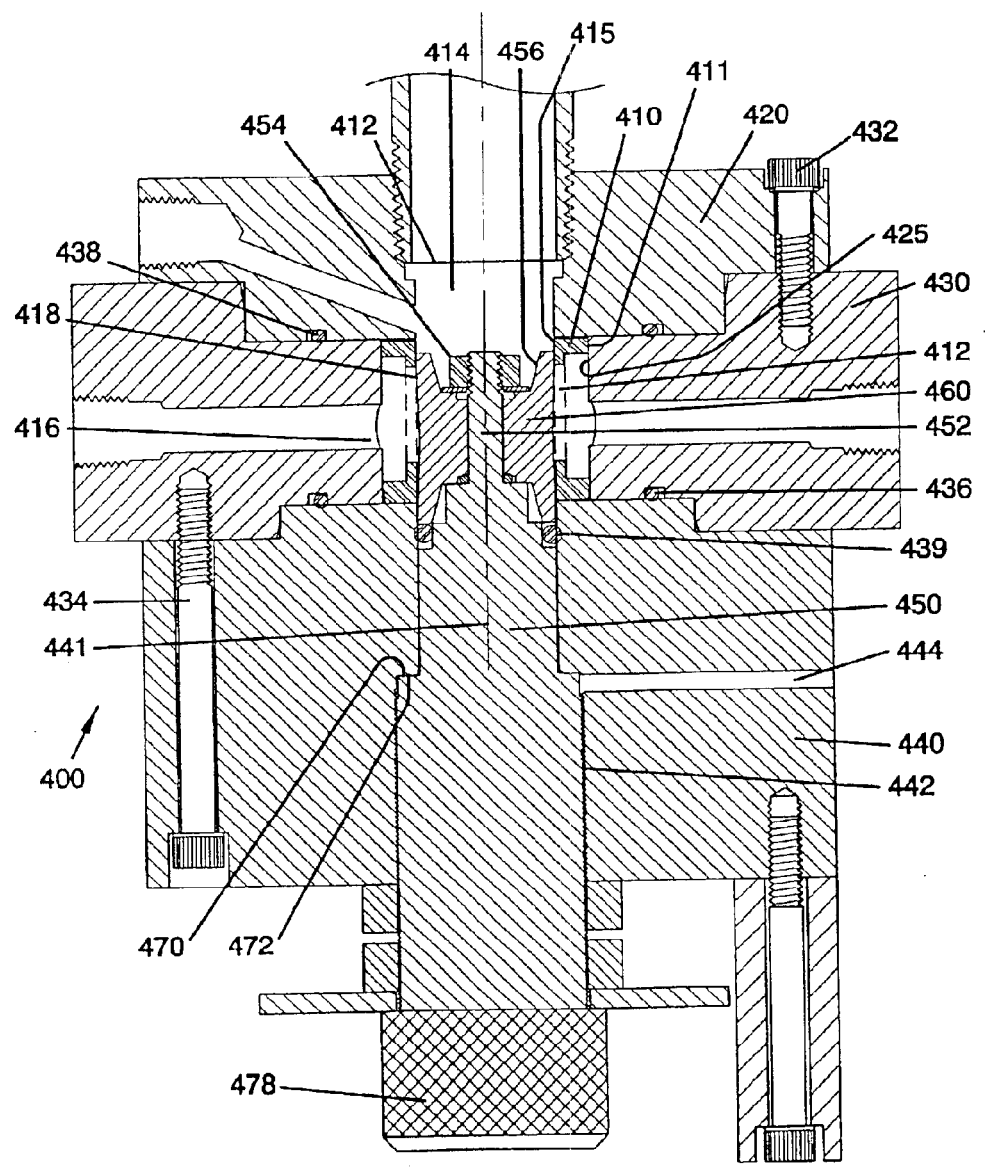
FIG. 12 is a cross-sectional view of an embodiment of a cylinder-style fluid distributor including a flow restrictor seal member and a housing orifice ring, with the seal member in the closed, no-flow position.
Figure 13:
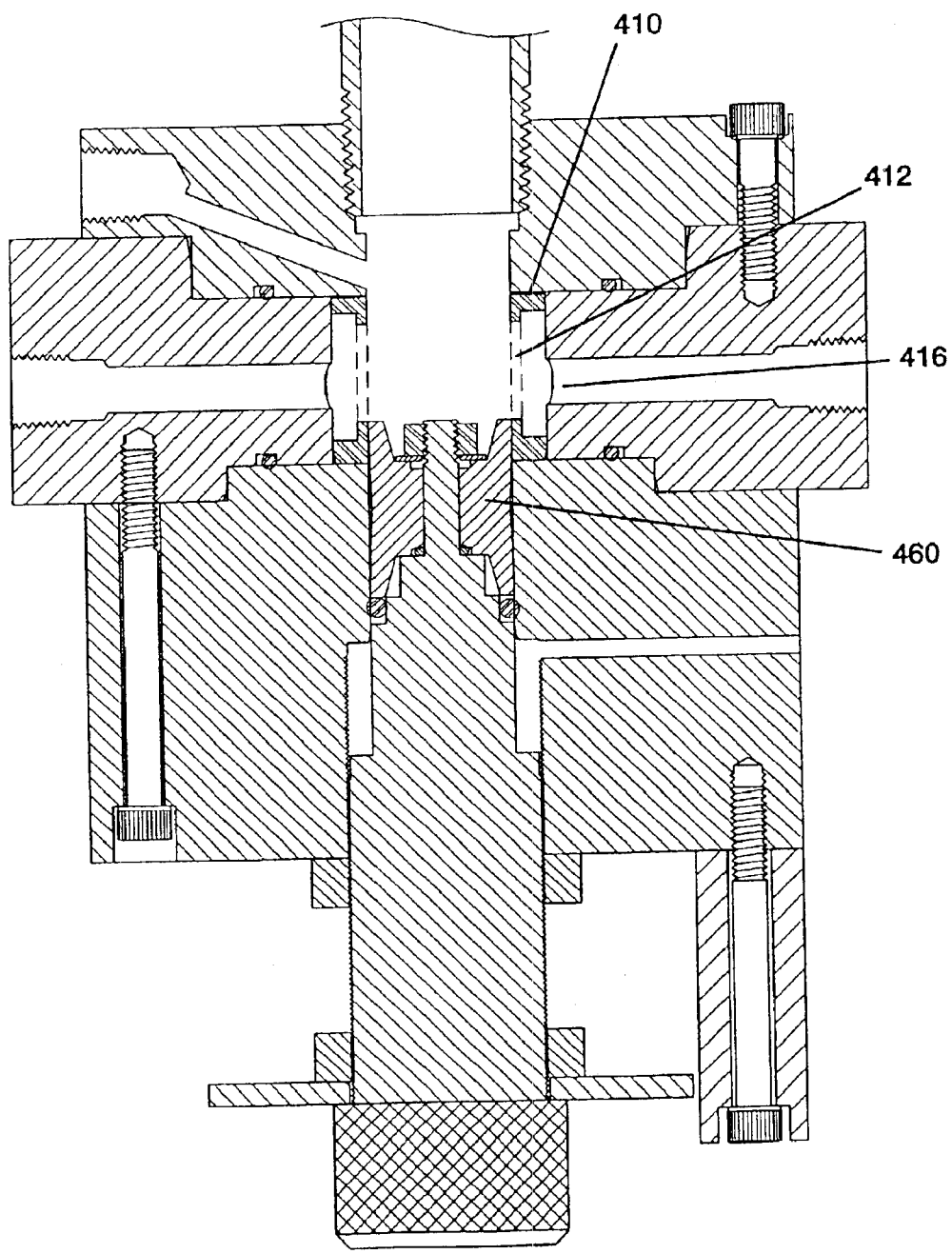
FIG. 13 is a cross-sectional view of the fluid distributor illustrated in FIG. 12, with the flow restrictor and seal member in a fully opened position.

The collar 17 may connect the hose 14 to the straight nipple 66, which as previously stated may have an axial length of at least six times the nominal diameter of the cross-sectional flow area of the nipple 66 to reduce fluid turbulence entering the flow housing 20. The inlet port 12 may define an inlet axis 36 perpendicular to a cross-sectional flow area of the inlet port 12. The distributor housing may include a plurality of outlet ports 16. Each of the plurality of outlet ports 16 may be positioned within an outlet port plane 37 substantially perpendicular to the inlet port axis 36. The inlet nipple 66 may be sealingly connected to a supply inlet port 12 in the distributor housing 20, such as by threads 34. The fluid then may be conducted through the flow chamber 14 and impinge upon an impingement surface 18 where the fluid may be directionally reoriented substantially uniformly to the plurality of distributor outlet ports 16. The impingement surface 18 may include an impingement surface plane 38, regardless of impingement surface shape. The impingement surface plane 38 may be substantially perpendicular to the inlet axis 36, for impingement of the fluid fertilizer from the inlet port 12 against the impingement surface. The impingement surface 18 may be substantially planar or may be non-planar, such as conical shaped, or otherwise, including surface irregularities, such as illustrated in FIGS. 12 and 13 and discussed below.

Each of the plurality of distributor outlet ports 16 may provide fluid communication with a respective one of the plurality of applicator lines 44. An applicator line adapter 42 may be secured to the fluid distributor 10, such as by threads 35 engaged in applicator receptacle 24, and to a polymer applicator line such as by grooved nipple 39. A hose clamp (not shown) may be provided to further secure line 44 to adapter 42.

The flow chamber 14 within the distributor housing 20 may fluidly interconnect the supply inlet port 12 with each of the plurality of distributor outlet ports 16. The flow chamber 14 may be slightly frustoconical shaped to slightly accelerate the fluid velocity in the flow chamber and correspondingly increase fluid back pressure upstream of impingement surface 18. Also to provide back pressure in the fertilizer upstream of the applicator lines 44, a maximum cross-sectional flow area in the flow chamber 14 between the inlet port 12 and the plurality of distributor outlet ports 16 is no greater than a cross-sectional flow area at the supply inlet port 12.

A flow restrictor 50 may be included to regulate fluid flow rate through the distributor housing 20, and to provide a restriction in the fluid flow path to provide a selected fluid back pressure, upstream of the flow restrictor 50. Thereby, flashing of the liquid phase to a gas phase may be controlled until the substantially liquid fluid has been uniformly distributed among each of a plurality of flow restrictor outlet ports 22 in the flow restrictor 50, to each of the plurality of applicator lines 44, or to each of a plurality of distributor housing outlet ports 16. The flow restrictor 30 may include a flow restrictor central axis 41, and may be selectively moveable relative to the distributor housing 20.

Figure 7:
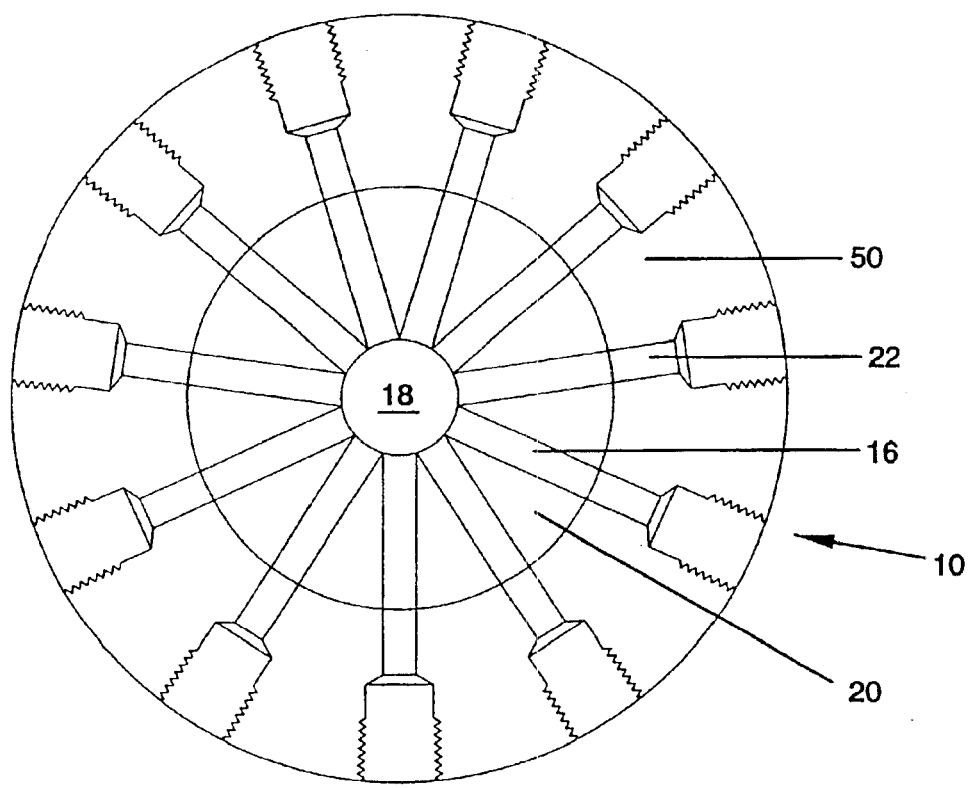
FIG. 7 is a cross-sectional top view taken along lines 7—7 in FIG. 5.

In one embodiment, as illustrated in FIGS. 5 and 6, the flow restrictor 50 may be positioned between the distributor housing 20 and the plurality of applicator lines 44 to regulate a fluid fertilizer flow rate through the distributor housing 20 and to the plurality of applicator lines 44. The ports 22 and 16 may be equally sized so that any expansion of the fertilizer occurs downstream of ports 22. The flow restrictor 50 may be substantially ring shaped and may include a plurality of flow restrictor ports 22 positioned between the distributor outlet ports 16 and the plurality of applicator lines 44. The plurality of flow restrictor ports 22 may be selectively positionable with respect to corresponding distributor outlet ports 16 by moving the ring shaped flow restrictor with respect to the distributor housing, thereby further restricting the flow area and creating expansion downstream from the ports 16. FIG. 7 illustrates a cross-sectional top view of a plurality of distributor outlet ports 16 and corresponding flow restrictor outlet ports 22 aligned to provide full-open fluid flow through the ports 16 and 22.

The flow restrictor 50 may be positioned circumferentially about an external surface of the fluid distributor housing 20, and seals, such as O-rings 58, may provide a fluid tight seal between the fluid distributor housing 20 and the flow restrictor 50. A lock-ring 70 may threadably engage the housing 20, and secure against the flow restrictor 50 to secure the circumferential position of the flow restrictor 50 with respect to the housing 20. The lock-ring 70 may thus be unthreaded to check or replace seals 58 or ring 50. Lock-nut 72 may secure the position of the lock-ring 70 to the housing 20.

To adjust the fluid flow rate through the distributor housing 20 and the fluid back pressure upstream of the flow restrictor 50, the flow restrictor ring 50 may be circumferentially rotated. Thereby, each of the plurality of flow restrictor ports 22 may be aligned or mis-aligned relative to a respective one of the plurality of distributor housing ports 16, to create a fluid restriction orifice at a plane of engagement between each port 22 and the respective port 16. Such orifice may provide a desired back pressure upstream of the orifice and a desired fertilizer fluid rate application control. Rotating the ring 50 relative to the housing 20 may substantially uniformly and infinitely adjust fluid flow rate between near zero flow to wide open when port 16 is fully aligned with port 22. Fluid pressure in the flow chamber 14 may be monitored through port 47, thereby sending one electronic signal representative of pressure to a computer, monitor or programmable controller. The pressure in chamber 14 also may be visually indicated, such as by pressure gauge 46.

An orifice position indicator may be provided on at least one of the housing 20 and the flow restrictor 50, such as indicator marks 76 and 77, as shown in FIG. 6, which may represent orifice opening percentage. A position-lock 74 may be provided to secure the rotational position of the flow restrictor 50 relative to the housing 20, and may include lock-bolt 78. A mounting bolt 29 may engage the housing 20 in a mounting hole 19 to secure the fluid distributor 10 to a mounting frame 31. The mounting frame 31 may then be secured to the knife implement 235.

In another embodiment, the flow restrictor ring 50 may be moved along axis 36 to create the misalignment of ports 22 and 16, and thereby alter the flow rate through the distributor 10.

Figure 8:
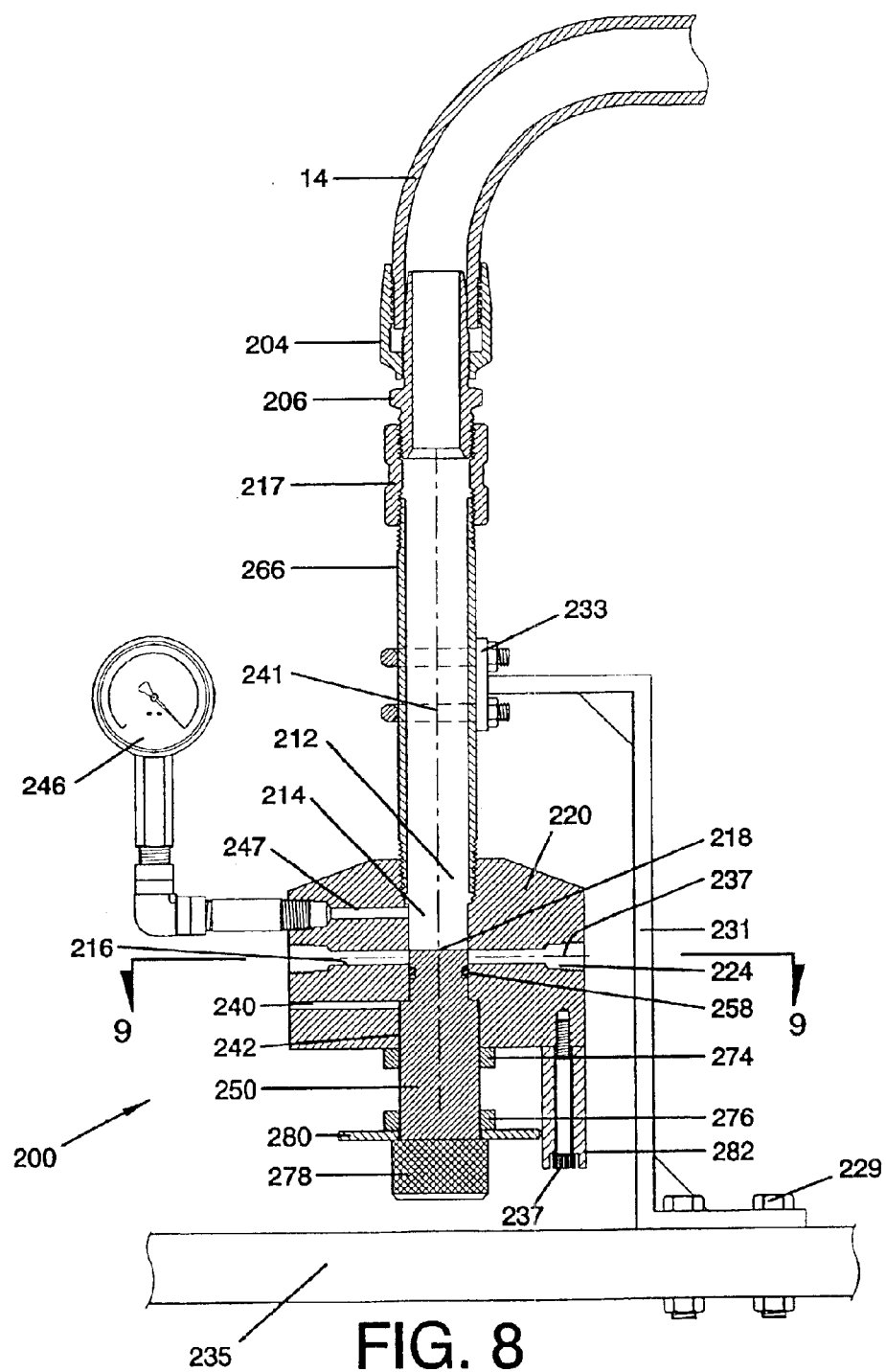
FIG. 8 is a cross-sectional side view of an internal cylinder-style fluid distributor, including a setting indicator to reflect the position of the flow restrictor relative to the distributor housing.
Figure 9:
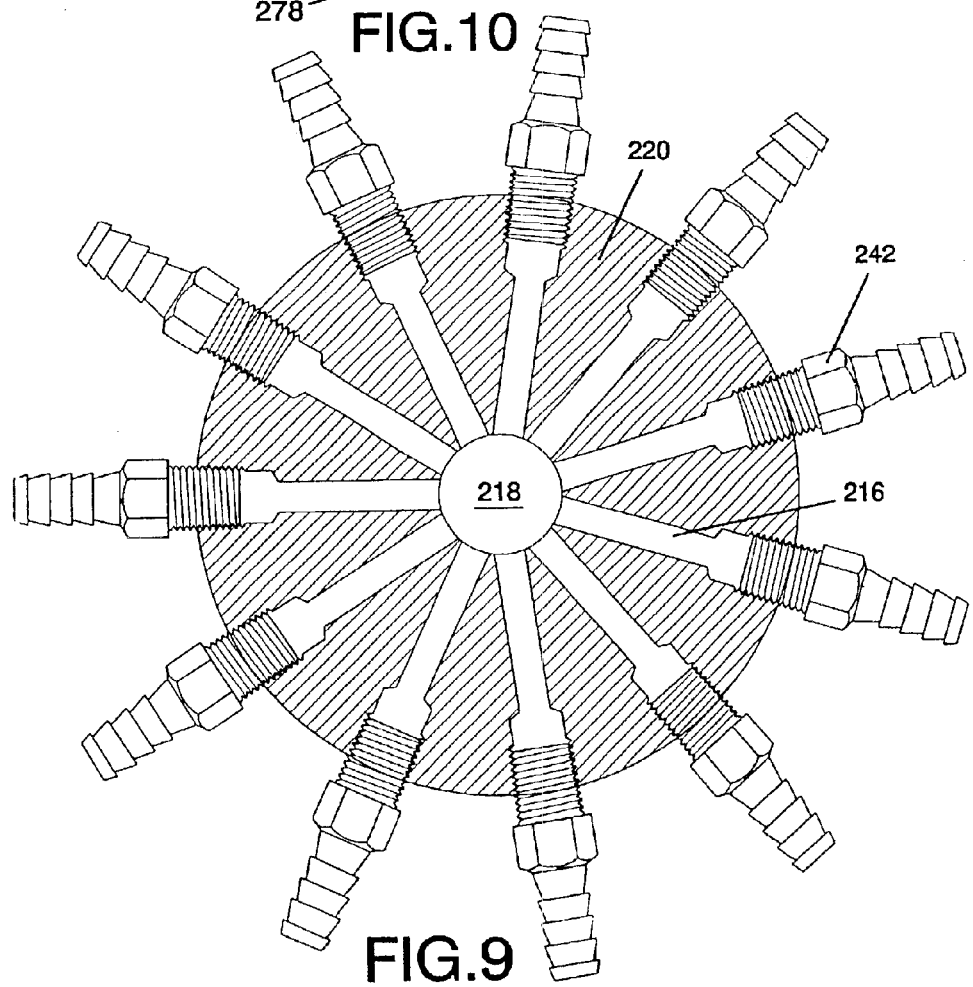
FIG. 9 is a cross-sectional top view taken along lines 9—9 in FIG. 8.

Referring to FIGS. 8 and 9, another embodiment of a fluid distributor 200 may comprise a substantially cylindrical shaped flow restrictor 250 positioned at least partially within an interior portion of the distributor housing 220, and may be referred to as a "cylinder style" flow restrictor. Fluid may be conducted through hose 14, through hose connectors 204, 206, and 217, and into straight nipple 266, which may have an axial length of at least six nominal diameters of the nipple 266. Fluid may enter the distributor housing 220 through housing inlet port 212, and then enter flow chamber 214. Pressure in the flow chamber 214 may be monitored through port 247, such as with pressure gauge 246.

The fluid passing through the distributor may impinge upon surface 218. In the embodiment illustrated in FIG. 8, flow restrictor 250 may be substantially cylindrical shaped and may be selectively moveable axially along the flow restrictor central axis 241 relative to the distributor housing 220 to regulate the fluid fertilizer flow rate through the fluid distributor 200. Flow restrictor 250 may threadably engage the distributor housing 220, such as by threads 242. Seal 258 may provide a fluid tight seal between the flow restrictor 50 and the housing 20.

Flow restrictor 250 may be axially positioned as illustrated in FIG. 8, with a portion of the flow restrictor extending axially across the plurality of ports 216, such that there is substantially no flow or very little fluid may flow through ports 216. Restrictor 216 may be rotated to move the restrictor 250 axially downward relative to the housing 220, such that ports 216 may become exposed and receive an increased amount of fluid flow rate as restrictor 250 is moved axially downward. Restrictor 250 may be axially positioned relative to the housing ports 216, such that the flow rate and/or the fluid back pressure upstream of the ports 216 may be regulated. Thereby, fluid pressure maintained upstream of ports 216 may prevent fluid flashing to gas prior to fluid distribution to the ports 216. In the event the seal 258 leaks some fluid, and to prevent fluid pressure accumulation below the seal 258, a bleeder port 240 may be included.

The position of the fluid flow restrictor 250 relative to the ports 216 may create an orifice along the fluid flow path at a plane of intersection between an outer surface of the flow restrictor 250 and a flow chamber end of a respective outlet port 216. The flow path size of the orifice may regulate fluid flow rate and fluid pressure upstream of the orifice. As illustrated in FIG. 9, the plurality of fluid distributor outlet ports 216 may be positioned within a common plane.

Figure 10:
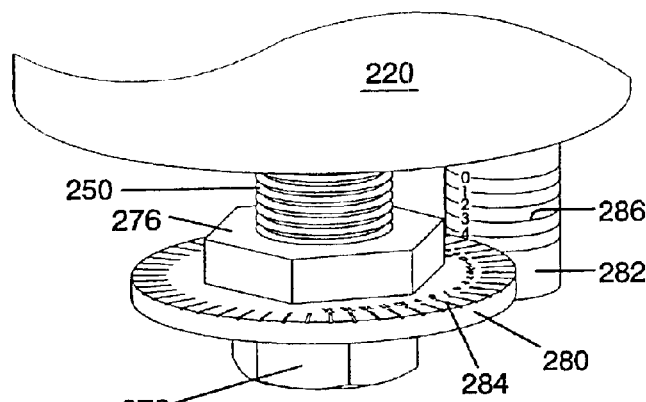
FIG. 10 is an orthogonal illustration of a setting indicator secured to a fluid distributor.

A position indicator may be included to reflect the axial position of the flow restrictor 250 relative to the plurality of outlet ports 216. The position indicator may include an indicator bar 282, which may be secured to the housing 220 by a bolt 237. A flow restrictor position marker 280 may be secured to the flow restrictor 250, such as between cap 278 and lock-nut 276. As illustrated in FIG. 10m, a plurality of indicator marks 286 may be provided on the indicator bar 282. Flow restrictor position marks 284 may also be included on the indicator marker 280. Cap 278 may be a nut including wrench flats, as illustrated in FIG. 10, or may include knurling for hand adjustment, as indicated in FIG. 8. The fluid distributor 200 may be mounted such as by clamps 233, bracket 231, and bracket bolts 229 for securing the distributor 200 to a knife or other agricultural implement 235 or object.

FIG. 12 and 13 illustrate an embodiment of a flow distributor 400, wherein the flow distributor housing comprises multiple components. The multiple component housing may be desirable to removably position orifice ports or other components within an interior portion of the housing. The illustrated embodiment includes an inlet passageway portion 420, including the inlet port 412 therein. A flow restrictor receiving portion 440 is provided for housing at least a portion of the flow restrictor 450. An outlet passageway portion 430 may be spaced between the inlet passageway portion 420 and the flow restrictor receiving portion 440, and may include the plurality of outlet ports 416 and a portion of the flow chamber 414. Seals 436 and 438 may be included to provide a fluid tight seal between components 420, 430 and 440. A plurality of bolts 432 and 434 may secure the components 420, 430 and 440 in engagement with each other. The flow restrictor 450 may be threadably and moveably engaged with housing component 440. Axial adjustment of the flow restrictor 450 may be accomplished by rotating the flow restrictor 450 relative to the housing component 440. A knurled cap 478 may be provided to manually rotate the flow restrictor 450. Seal member 439 prevents fluid pressure in the flow chamber 414 from escaping between the flow restrictor 450 and the distributor housing 430. Port 444 may prevent the accumulation of pressure below seal 439, between the flow restrictor 450 and housing 440. Shoulder 472 in the distributor housing 440 and shoulder 470 on the fluid restrictor 450 provides engaging stop surfaces for axially positioning the flow restrictor 450 relative to the housing 440 when the flow restrictor 450 is in a fully closed position.

To make a fluid distributor applicable to a wide variety of application rates, an interchangeable fluid orifice may be provided along the flow path of each of the plurality of outlet ports. Thereby, a small orifice may be positioned along each flow path for low fertilizer application rates, but a large orifice may be positioned along each flow path for higher fertilizer application rates.

To accommodate a desired fluid flow rate or fertilizer application rate across a broad range of application rates, particularly at a relatively low fluid pressure in the flow chamber 414, each of the outlet ports 416 has a minimum outlet port diameter or cross-sectional flow area for any particular number of distributor outlet ports. Also, if the diameter of the flow restrictor is increased, the corresponding flow area in the chamber 414 would undesirably increase over the inlet flow diameter, thereby possibly flashing the fluid. The fluid distributor 400 has a large number of outlet ports 416, and since the flow restrictor outlet ports 416 are positioned within the same plane and converge, adjacent flow restrictor ports would begin to overlap as the ports 416 approach an axial center 441 of the flow restrictor. This would result in port-to-port cross-flow or fluid communication between ports, and thus result in non-uniform application rates between applicator lines 44. As a practical matter, a minimum wall thickness between the converging outlet ports may be required for reliable fabrication. FIG. 9 illustrates an effective limitation to the number of applicator ports that a particular fluid distributor may provide.

To overcome the limitation in the number of applicator lines or outlet ports that a particular fluid distributor may provide, and to permit providing a selection of orifice sizes within the fluid distributor 400 while not increasing the flow area in the chamber 414, a substantially sleeve-shaped housing orifice ring 410 may be positioned within the outlet portion 430 of the fluid distributor housing. As illustrated in FIGS. 12, 13, 14, and 15, the housing orifice ring 410 may be positioned circumferentially about the flow restrictor 450, and may include a plurality of housing orifice ring passageways 412 or orifices, each to conduct the fluid fertilizer to a respective one of the plurality of distributor outlet ports 416. The flow restrictor 450 may be axially moveable within an interior portion of the housing orifice ring 410, along the flow restrictor central axis 441.

Figure 15:
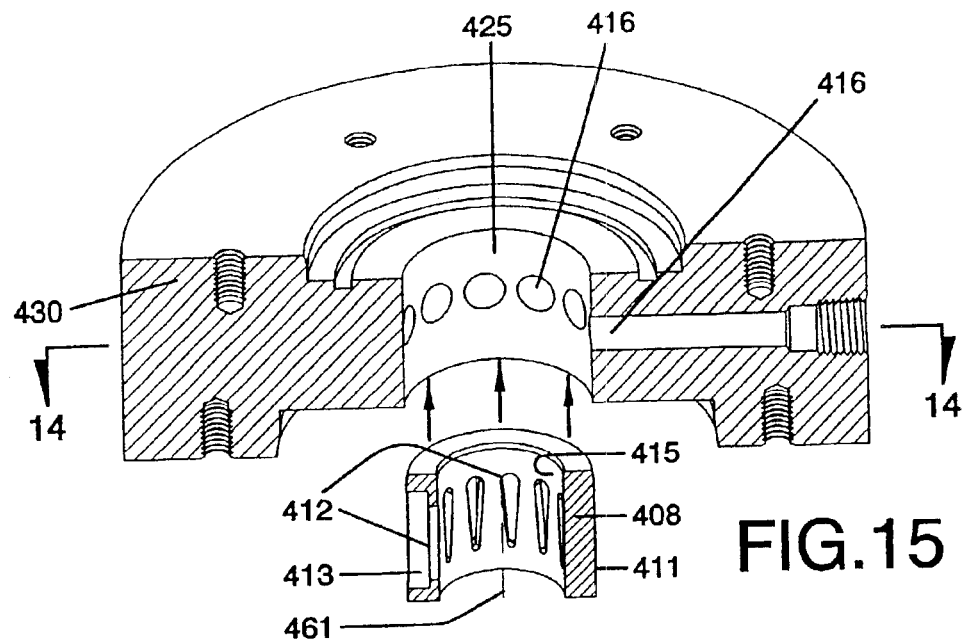
FIG. 15 is a cross-sectional orthogonal illustration of a flow restrictor with the housing orifice ring partially displaced to illustrate port geometric shapes and flow relationships.
Figure 14:
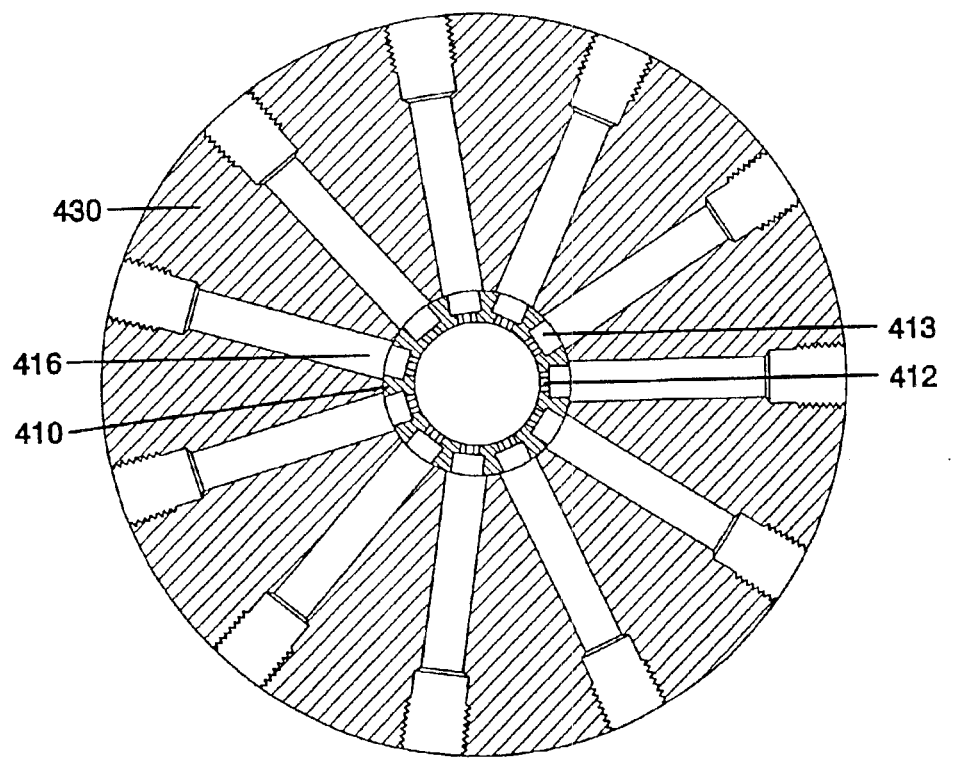
FIG. 14 is a cross-sectional top view of a fluid distributor including a housing orifice ring positioned within a distributor housing.

As illustrated in FIG. 15, each of the plurality of housing orifice ring passageways may be substantially elongated slots 412 each having a slot axis 461 substantially parallel with the flow restrictor central axis 441. A corresponding slot cavity 413 may be provided in conjunction with each slot 412 to conduct a cross-sectional flow area of fluid through the slot 412 and distributor outlet port 416. The cross-sectional flow area of the conducted fluid in the slot cavity 413 is at least as large as the cross-sectional flow area of the slot 412, so that any fluid expansion occurs downstream of slot 412. Each slot 412 may have an axial length along the slot axis 461 greater than a cross-sectional diameter of the respective distributor outlet port 416, while having a slot width perpendicular to the slot axis 461 that is narrow enough to accommodate the high number of distributor outlet ports 416 in the distributor 400. Each slot cavity 413 is isolated from adjacent slot cavities by the orifice ring body material, as illustrated by surface 408 in FIGS. 14 and 15. An internal diameter of the housing outlet passageway portion 430 is sufficiently large that a large number of distributor outlet ports 416 may be provided within the distributor outlet ports, intersecting as they converge toward the center of the outlet passageway portion 430. Orifice ring ports 412 and cavities 413 may be tapered or tear-drop shaped to provide greater control or regulation of flow rate as the flow restrictor is axially positioned with respect to the plurality of housing orifice ring ports 412.

A radially outward surface 411 of the housing orifice ring 410 may engage an inner surface 414 of the housing component 430. An outer surface 412 of the flow restrictor 450 thus may moveably engage an internal surface 415 of the housing orifice ring 410. As illustrated in FIG. 12, the flow restrictor may reduce fertilizer flow rate to substantially zero flow when the flow restrictor covers the plurality of slots 412. FIG. 13 illustrates a flow restrictor positioned to allow full flow to each of the plurality of slots 412. The flow restrictor may be positioned at any desired position between the positions illustrated in FIGS. 12 and 13.

A fluid tight seal may be desired between flow restrictor 450 and either the housing 430 or the housing orifice ring 410 when the flow restrictor 450 is in the closed position, as illustrated in FIG. 12. A flow restrictor seal member 460 may be secured to a seal end of the flow restrictor 450, such as by threaded stem 452 and washer and nut 454. The seal member 460 preferably is fabricated from a polymer compound, such as nylon, nitryl, rubber, or any other thermoplastic or resilient material. The outer surface 418 of the flow restrictor seal member 460 may slideably engage an inner surface 415 of the housing orifice ring 410. By forming the ring 410 and/or seal member from a resilient material, such a a thermoplastic polymer, an interference fit may be achieved, thereby preventing any radial deflection between the components which may vary the flow rate between the distributor outlet ports. In addition, this interference fit allows fluid flow through the fluid distributor to be shut off.

An upper surface 456 of the seal member may provide an impingement surface for the fluid moving through the flow chamber 414. Impingement surface 456, including surfaces on nut 454 and stem 452 exposed to flowing fluid, may collectively form an impingement surface plane having a cross-sectional area which is concentric about the fluid inlet and is substantially the same as the cross-sectional area of the flow chamber 414. The impingement surface plane reorients the fluid flow direction from along the inlet axis to pass through the passageways 412 in the housing orifice ring 410 and/or an inner orifice ring 510 as discussed below.

Figure 17:
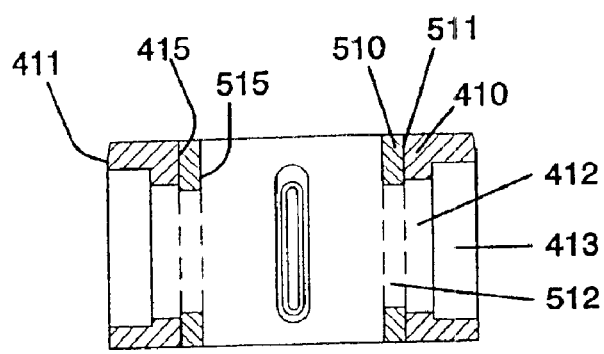
FIG. 17 is a cross-sectional side view of a housing orifice ring with an inner housing orifice ring positioned therein.
Figure 16:
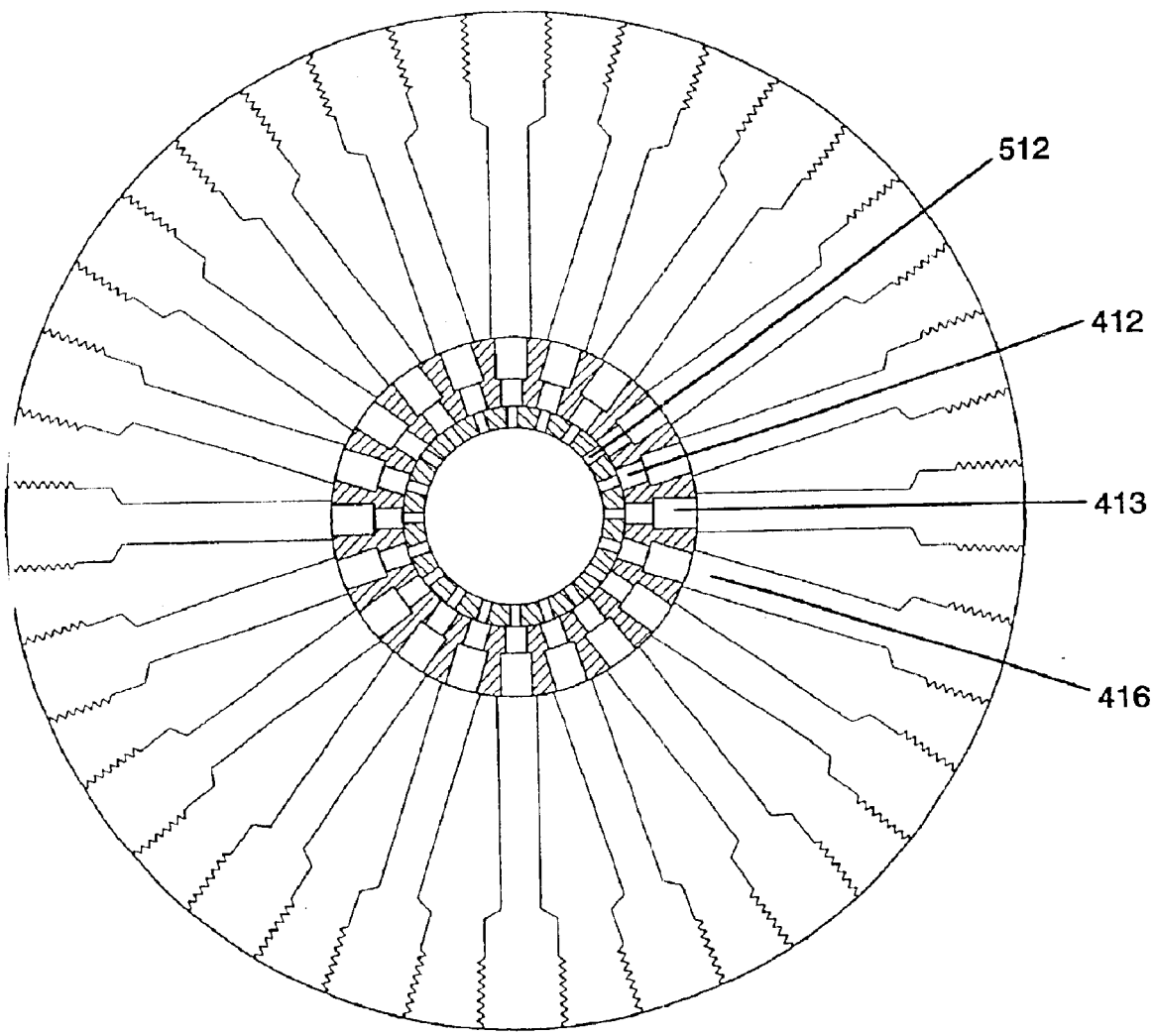
FIG. 16 is a cross-sectional top view of a cylinder-style fluid distributor including a housing orifice ring, an inner housing orifice ring, and a plurality of outlet ports.

FIGS. 16 and 17 illustrate an embodiment of a fluid distributor designed to accommodate an even greater number of distributor outlet ports 416 and applicator lines 44. An inner housing orifice ring 510 may be positioned within an interior portion of the housing orifice ring 410 and circumferentially about the flow restrictor 450 or flow restrictor seal member 460. The inner housing orifice ring may conduct fluid from the flow chamber 414, through each of a plurality of inner housing orifice ring slots 512, and to a respective housing orifice ring slot 412. The inner housing orifice ring 510 may not require a differently shaped cavity between the inner housing orifice ring slot 512 and the respective housing orifice ring slot 412.

Radially outward surface 511 of the inner housing orifice ring 510 may sealingly engage a radially inward surface 415 of the housing orifice ring 410. A radially outward surface of the flow restrictor 450 or a radially outward surface 418 of the seal member 460 may moveably engage a radially inward surface 515 of the inner housing orifice ring 510.

Figure 18:
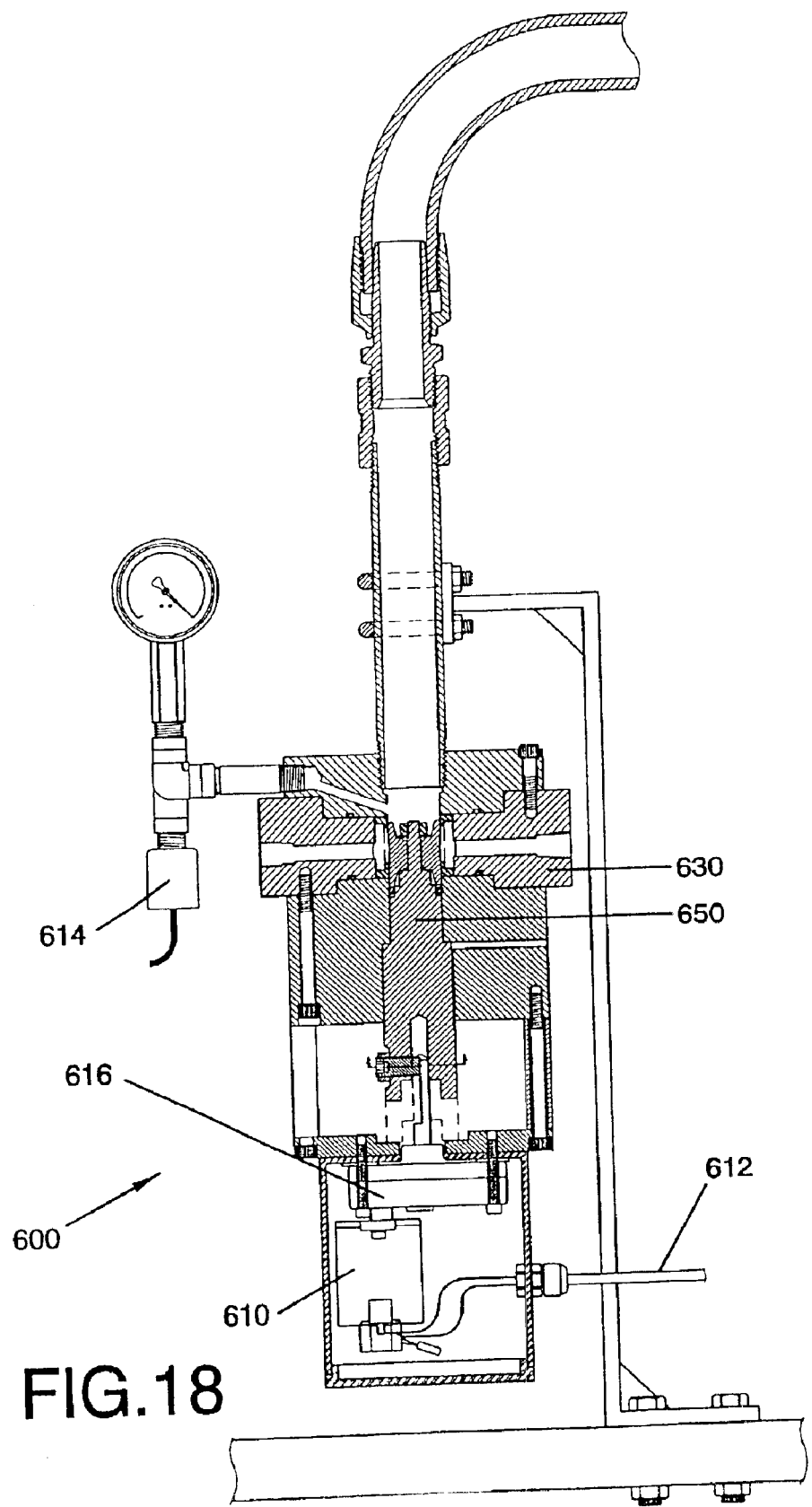
FIG. 18 is a cross-sectional side view of yet another embodiment of a fluid distributor including a motor secured thereto to rotate the fluid distributor and axially position the fluid distributor relative to the distributor housing, with a seal member and flow restrictor in the closed position.

FIG. 18 illustrates an embodiment of a cylinder-style fluid distributor 600 wherein axial movement of the flow restrictor may be performed by an actuator 610, such as an electric motor, pneumatic or hydraulic actuator. The actuator 616 may be coupled to the flow restrictor 650 directly or by a combination of gears, linkages and/or couplings. Actuated movement of the flow restrictor 650 relative to the distributor housing 630 may be performed automatically by a programmable controller, such as controller 94 illustrated in FIG. 19. A pressure signal representative of a sensed pressure in the flow area upstream of the flow restrictor 650, such as in a flow chamber, may be provided to the controller 94 by a pressure sensor 614. The controller 94 may provide actuator control signals to the actuator through one or more control conduits 612. The controller may control the flow restrictor to maintain a desired application rate and a desired minimum back-pressure upstream of the flow restrictor 650. Incremental adjustments to flow restrictor position may be required as the fertilizer is removed from the supply tank 11 and supply tank pressure drops.

Figure 11:
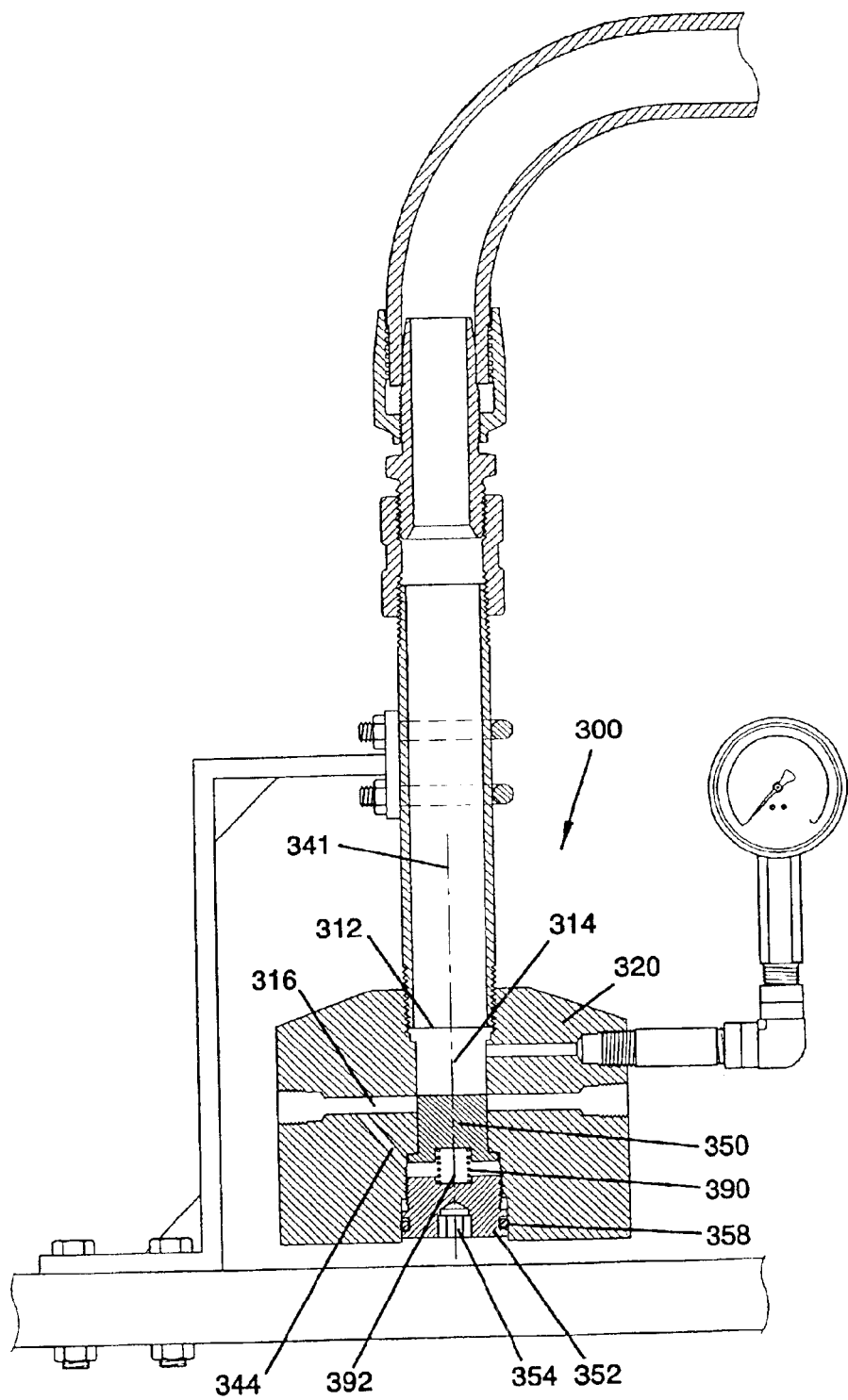
FIG. 11 is a cross-sectional side view of another embodiment of a fluid distributor including a piston-style flow restrictor.

FIG. 11 illustrates an embodiment of a fluid distributor having an adjustable flow restrictor 350, which may be responsive to a mechanical biasing force and/or fluid pressure in the flow chamber 314 to regulate fluid flow through the fluid distributor 300. The flow restrictor 350 may be axially moveable relative to the distributor housing 320 in response to a fluid pressure upstream of the flow restrictor, such as in the flow chamber 314. The flow restrictor also may be moveably responsive to a mechanical biasing force, such as provided by spring 390. An equalizer line 344 may be provided to provide fluid/pressure communication between piston chamber 392 and at least one of the plurality of distributor outlet ports 316. The mechanical biasing force provided by biasing member 390 may be adjusted by moving a biasing regulator 352. The biasing regulator 352 may threadably engage the distributor housing for regulating the biasing force applied by the biasing member 390. Seal 358 may prevent fluid from leaking past the biasing regulator 352. A tool profile 354 may be provided within a portion of the regulator 352 to facilitate adjustment of the regulator 352 relative to the housing 320. The biasing member may engage each of the flow restrictor 350 and the regulator 390 to apply a selected biasing force to the flow restrictor 350.

The biasing member 390 may provide a closing force to the flow restrictor 350 such that the flow through the distributor may be regulated, and such that fluid pressure in the flow chamber 314 may be maintained higher than the fluid pressure within the fluid outlet ports. Thereby, substantial gas flashing from the fluid in the flow chamber 314 may be prevented until the fluid is distributed from the flow chamber 314 to the plurality of distributor outlet ports 316. Biasing member adjustment may regulate the rate at which fluid may be conducted from the flow chamber 314 into the plurality of distributor outlet ports 316.

Referring to FIGS. 1, 5, 8, 11, 12, and 19, a method is provided for distributing fluid fertilizer conducted from a supply vessel 11 to each of a plurality of applicator lines 44. The method may comprise providing a distributor housing including a supply inlet port and a plurality of distributor outlet ports each for fluid communication with a respective one of the plurality of applicator lines 44. A flow chamber within the distributor housing fluidly interconnects the supply inlet port with each of the plurality of distributor outlet ports. A flow restrictor moveable relative to the distributor housing may be selectively moved relative to the distributor housing to regulate a fluid fertilizer flow rate through the distributor housing.

The fluid distributor may provide a maximum cross-sectional flow area in the flow chamber between the supply inlet port and the plurality of distributor outlet ports no greater than a cross-sectional flow area at the supply inlet port. As illustrated in FIGS. 5 and 6, the fluid distributor 10 may provide a substantially ring shaped flow restrictor 50 having a plurality of flow restrictor ports 22 between the plurality of distributor outlet ports 16 and the plurality of applicator lines 44. The ring shaped flow restrictor 50 may be selectively moved with respect to the distributor housing 20 to regulate a fluid fertilizer flow rate through the distributor housing 20.

In preferred embodiments, the seal member 460 and/or the housing orifice ring member may be formed from a polymer material, such as nylon, nitryl, rubber or other thermoplastic type materials. The distributor housing, 20, 220, 320, 420, 430, and/or 440, and the flow restrictor 50, 250, 350, or 450, may be formed from a metallic material, such as steel, cast iron, or aluminum. A flow divider 100 may be formed from substantially metallic materials.

In alternative embodiments, the various components may be formed from other materials, such as ceramics. Other alternative embodiments may be formed from thermoplastic or polymer materials, including the distributor housing and the flow restrictor. O-rings and other seal members may be provided to effect desired seals in embodiments comprising various structural changes to the components.

An alternative embodiment may comprise a flow restrictor that is rotated or moved circumferentially about a flow restrictor axis, to move between a closed and an open position. Such flow restrictor may include an arrangement of a plurality of ports positioned to conduct fluid between an upper surface of the flow restrictor and a plurality of outlet ports. Thereby, distribution of a substantially fluid liquid may be performed within the fluid distributor prior to a pressure drop that may lead to fluid flashing.

It may be appreciated that various changes to the details of the illustrated embodiments and systems disclosed herein, may be made without departing from the spirit of the invention. While preferred and alternative embodiments of the present invention have been described and illustrated in detail, it is apparent that still further modifications and adaptations of the preferred and alternative embodiments will occur to those skilled in the art. However, it is to be expressly understood that such modifications and adaptations are within the spirit and scope of the present invention, which is set forth in the following claims.

What is claimed is:

1. A fluid fertilizer flow divider for distributing fluid fertilizer conducted from a supply vessel to at least two fluid fertilizer distributors, comprising:

a divider supply inlet port for receiving the fluid fertilizer into the flow divider;

at least two divider outlet ports each for fluid communication with a respective fluid fertilizer distributor;

a divider flow chamber for fluidly interconnecting the divider supply inlet port with each of the at least two divider outlet ports, wherein a maximum cross-sectional flow area in the divider flow chamber between the divider supply inlet port and the at least two divider outlet ports is no greater than a cross-sectional flow area at the divider supply inlet port; and the divider inlet port defines a divider inlet axis, and the divider flow chamber has a divider impingement surface opposite the divider flow chamber with resoect to the inlet port and substantially perpendicular to the divider inlet axis for impingement of the fluid fertilizer from the divider inlet port.

2. The fluid fertilizer flow divider as defined in claim 1, wherein the divider inlet port defines a divider inlet axis, and each of the at least two divider outlet ports lies within a divider outlet port plane substantially perpendicular to the divider inlet port axis.

3. A fluid fertilizer flow divider as defined in claim 1, further comprising:

a rigid nipple interconnected with the divider supply inlet port, the nipple having an axial length at least six times a nominal diameter of the nipple.

4. A fluid fertilizer flow divider as defined in claim 1, wherein the impingement surface is inline with the divider inlet axis.

5. A fluid fertilizer flow divider as defined in claim 1, wherein the impingement surface is stationary with respect to the supply inlet port and the at least two outlet ports.

6. A fluid fertilizer flow divider as defined in claim 1, further comprising:
   a unitary divider body defining the divider supply inlet port and the at least two divider outlet ports.

7. A fluid fertilizer flow divider for distributing fluid fertilizer conducted from a supply vessel to at least two fluid fertilizer distributors, comprising:
   a divider supply inlet port for receiving the fluid fertilizer into the flow divider;
   at least two divider outlet ports each for fluid communication with a respective fluid fertilizer distributor;
   a divider flow chamber for fluidly interconnecting the divider supply inlet port with each of the at least two divider outlet ports; and
   a divider body defining the divider supply inlet port, the at least two divider outlet ports and the divider flow chamber, wherein a maximum cross-sectional flow area in the divider flow chamber between the divider supply inlet port and the at least two divider outlet ports is no greater than a cross-sectional flow area at the divider supply inlet port.

8. A fluid fertilizer flow divider as defined in claim 7, further comprising:
   the divider inlet port defines a divider inlet axis, and the divider flow chamber has a divider impingement surface opposite the divider flow chamber with respect to the inlet port and substantially perpendicular to the divider inlet axis for impingement of the fluid fertilizer from the divider inlet port.

9. A fluid fertilizer flow divider as defined in claim 8, further comprising:
   the impingement surface is inline with the divider inlet axis.

10. A fluid fertilizer flow divider as defined in claim 8, further comprising:
   the impingement surface is stationary with respect to the supply inlet port and the at least two outlet ports.

11. A fluid fertilizer flow divider as defined in claim 7, further comprising:
   a rigid nipple interconnected with the divider supply inlet port, the nipple having an axial length at least six times a nominal diameter of the nipple.

12. A fluid fertilizer flow divider for distributing fluid fertilizer conducted from a supply vessel to at least two fluid fertilizer distributors, comprising:
   a divider supply inlet port for receiving the fluid fertilizer into the flow divider;
   at least two divider outlet ports each for fluid communication with a respective fluid fertilizer distributor;
   a divider flow chamber for fluidly interconnecting the divider supply inlet port with each of the at least two divider outlet ports;
   the divider body defining the supply inlet port, the at least two divider outlet ports and the divider flow chamber; and
   the divider inlet port defines a divider inlet axis, and the divider flow chamber has a divider impingement surface opposite the flow chamber with respect to the inlet port, is substantially perpendicular to the divider inlet axis for impingement of the fluid fertilizer from the divider inlet port, and is stationary with respect to the supply inlet port.

13. A fluid fertilizer flow divider as defined in claim 12, further comprising:
   a rigid nipple interconnected with the divider supply inlet port, the nipple having an axial length at least six times a nominal diameter of the nipple.

14. A fluid fertilizer flow divider as defined in claim 12, wherein the impingement surface is inline with the divider inlet axis.

15. A fluid fertilizer flow divider as defined in claim 12, further comprising:
   a unitary divider body defining the divider supply inlet port and the at least two divider outlet ports.

* * * * *